United States Patent
Yoshimura et al.

(10) Patent No.: US 6,589,909 B2
(45) Date of Patent: Jul. 8, 2003

(54) PROCESS FOR PRODUCING CATALYST FOR STEAM REFORMING OF METHANOL

(75) Inventors: Masatoshi Yoshimura, Ibaraki (JP); Yuzuru Takahashi, Ibaraki (JP); An-pang Tsai, Ibaraki (JP)

(73) Assignee: Japan as represented by Director General of Ministry of Education, Culture, Sports, Science and Technology National Research Institute for Metals, Ibaraki (JP)

(*) Notice: Subject to any disclaimer, the term of this patent is extended or adjusted under 35 U.S.C. 154(b) by 66 days.

(21) Appl. No.: 09/821,048

(22) Filed: Mar. 30, 2001

(65) Prior Publication Data

US 2001/0049338 A1 Dec. 6, 2001

(30) Foreign Application Priority Data

Mar. 31, 2000 (JP) ......................................... 2000-097098

(51) Int. Cl.$^7$ ............................ B01J 23/40; B01J 23/42; B01J 23/72; B01J 23/56; B01J 23/70
(52) U.S. Cl. ...................... 502/327; 502/331; 502/332; 502/336; 502/346
(58) Field of Search ................................. 502/327, 331, 502/332, 336, 346, 355, 414; 423/658.5, 659

(56) References Cited

U.S. PATENT DOCUMENTS

| | | | | | |
|---|---|---|---|---|---|
| 3,839,011 | A | * | 10/1974 | Larson et al. | 75/0.5 BA |
| 4,175,954 | A | * | 11/1979 | Oden et al. | 75/138 |
| 4,188,362 | A | * | 2/1980 | Edwards et al. | 423/22 |
| 4,824,482 | A | * | 4/1989 | Baldi | 75/254 |
| 6,087,296 | A | * | 7/2000 | Harper | 502/301 |
| 6,239,065 | B1 | * | 5/2001 | Schulz et al. | 502/337 |
| 6,277,895 | B1 | * | 8/2001 | Zhou et al. | 518/715 |
| 6,395,403 | B2 | * | 5/2002 | Schmidt | 428/570 |

FOREIGN PATENT DOCUMENTS

| | | | |
|---|---|---|---|
| SU | 430876 A | * | 11/1974 |
| SU | 1098929 A | * | 6/1984 |

* cited by examiner

Primary Examiner—Stanley S. Silverman
Assistant Examiner—Cam N. Nguyen
(74) Attorney, Agent, or Firm—Wenderoth, Lind & Ponack, L.L.P.

(57) ABSTRACT

A method by which a highly active catalyst for the steam reforming of methanol is efficiently produced by a simple process. The catalyst is produced from alloy fine particles obtained by first grinding an Al alloy containing quasi-crystals consisting of aluminum, copper and at least one metal atom selected from Fe, Ru and Os, and then leaching the ground Al alloy.

3 Claims, No Drawings

PROCESS FOR PRODUCING CATALYST FOR STEAM REFORMING OF METHANOL

BACKGROUND OF THE INVENTION

1. Field of the Invention

The present invention relates to a novel process for producing a catalyst used for steam reforming of methanol to produce hydrogen.

2. Description of the Related Art

In recent years, utilization of hydrogen as a clean energy source has been widely studied from the viewpoint of environmental problems such as global warming caused by an increase in $CO_2$ discharge. However, because hydrogen is a gas, its storage is difficult, and when used as a fuel for moving bodies such as automobiles, it is preferable that an appropriate amount of hydrogen is generated only when in use. One example of such method to obtain hydrogen is the use of methanol, which is the form of liquid suitable for storage and transportation, as a starting material.

Methanol is easily reformed into a gas of high-hydrogen content in the presence of a catalyst and steam, through a steam reforming reaction shown in equation (1):

$$CH_3OH + H_2O \rightarrow 3H_2 + CO_2 \qquad (1)$$

This steam reforming reaction of methanol, as compared with steam reforming of hydrocarbons such as natural gas and LPG, allows the smooth production of hydrogen at low temperatures, and has advantages such as generating fewer by-products such as CO. Therefore, catalysts for the efficient production of hydrogen from methanol have been in demand.

Regarding the process for producing a catalyst for the steam reforming of methanol, methods of producing catalysts consisting of copper/zinc/aluminum oxides or copper/zinc/chromium oxides etc. by kneading or co-precipitation (for example, JP-A 59-189937 etc.) are well known.

Also, from the viewpoint of removing impurities from the catalyst, the process for producing Raney type catalysts by developing a binary or ternary alloy with an aqueous solution of an alkali metal hydroxide is known. In JP-A7-265704, a method of utilizing an amorphous alloy prepared by the rapid solidification of a melt is discussed.

Further, in JP-A 7-126702, quasi-crystalline Al alloy ultra fine particles consisting of Al and Cu, Ni, Pd etc. are described as having high activity in the decomposition of methanol.

Heretofore, kneading method and co-precipitation method are used, in general, for producing catalysts for the steam reforming of methanol. In the kneading method, mixing of fine particles to obtain a uniform mixture is difficult due to the low fluidity of the substances subjected to physical mixing; hence, production of a highly active catalyst can hardly be expected. In the co-precipitation method, the materials are mixed uniformly in a molecular state, thus allowing the production of a highly active catalyst. However, because a solution of catalytic components is handled, productivity per unit volume is low, and tedious processes such as pH adjustment of the solution, calcination at high temperature, and wastewater treatment are necessary.

On the other hand, in the preparation of a Raney type catalyst, the material used is an alloy, causing grinding and processing to be difficult. There is also the disadvantage that when an amorphous alloy prepared by rapid solidification is used, productivity and thermal stability becomes low, due to crystallization at high temperature.

Further, in the method described in JP-A 7-126702, wherein a catalyst obtained from a quasi-crystalline Al alloy is used, the catalyst is produced by a method in which the alloy is melted and evaporated, after which the ultra fine particles are collected. Therefore, the process is high in cost and poor in productivity.

The object of the present invention is to provide an easy and efficient method of producing highly active catalyst for the steam reforming of methanol.

SUMMARY OF THE INVENTION

Through extensive studies of the process for producing a catalyst for the steam reforming of methanol, which has so far contained the above described problems, the inventors of the present invention have found that by grinding an Al alloy containing a quasi-crystal compound of aluminum, copper and other specific group VIII metals, and leaching the resulting alloy particles, a catalyst comprising Cu-based alloy fine particles can be efficiently obtained, and that the catalyst obtained shows high activity in the steam reforming reaction of methanol, thus arriving at the present invention.

That is, the present invention relates to a process for producing a catalyst for the steam reforming of methanol, which comprises grinding an Al alloy containing quasi-crystals composed of aluminum, copper and at least one metal atom selected from Fe, Ru and Os, followed by leaching in a definite solution.

DETAILED DESCRIPTION OF THE INVENTION

The Al alloy containing quasi-crystals used as the starting material for the present invention has a quasi-crystalline structure and an icosahedral phase without periodicity, but possesses a 5-fold symmetry forbidden in classic crystallography.

This quasi-crystal is characteristic in that it is less likely to undergo plastic deformation because of its quasi-periodic structure, and that it is brittle. In general, a material used as a catalyst should have a large surface area in order to attain sufficient activity; in this respect, the quasi-crystal is excellent in grinding processability and can thus be easily ground to as fine as in microns to achieve a large surface area.

The Al alloy containing quasi-crystals in the present invention includes not only those alloys composed of single phase quasi-crystals, but also of mixtures containing approximant crystals and other crystalline phases, as well as amorphous phases in addition to the quasi-crystalline phase.

The quasi-crystal expressed by the following formula:

$$Al_{100-a-b}Cu_aM_b$$

(wherein M is at least one metallic element selected from Fe, Ru and Os, and 17 atom %≦a≦30 atom %, and 7 atom-%≦b≦17 atom-%), which may be used as the starting material of the catalyst for steam reforming of methanol of the present invention, is known as a stable phase, with a melting point reaching up to about 1100° C. Accordingly, a high-purity quasi-crystalline phase can be obtained by annealing at a high temperature of about 800° C., and the annealed alloy can even be used satisfactorily as a catalyst carrier.

The composition of the quasi-crystal used as the starting material in the present invention, in terms of metal atom-%, is 17 to 30% copper, preferably 22 to 28%, and 7 to 17% in total of iron, ruthenium and osmium, preferably 9 to 15%, and the rest balanced by aluminum.

The Al alloy containing quasi-crystals, used as the starting material for the catalyst for the steam reforming of methanol of the present invention, is obtained as a button ingot by arc-melting pure metals (i.e., pure Al, pure Cu, pure Fe, pure Ru, pure Os). The purity of the quasi-crystalline phase can be further improved by annealing the ingot while preventing oxidation in, for example, an inert atmosphere. The quasi-crystalline phase can also be obtained by rapid solidification. However, by using the annealing method, instead of a rapid solidification method, higher purity of quasi-crystal can be obtained with higher productivity.

In the present invention, the Al alloy ingot containing quasi-crystals thus obtained is ground to increase its surface area as a catalyst. Grinding is conducted to reduce the particle size to 0.1 to 10 μm, preferably 10 μm or less.

The catalyst of the present invention is then produced by leaching the resulting quasi-crystalline fine powder. By this leaching treatment, the thin film of $Al_2O_3$ formed on the surface of the crystal can be removed, while dissolving Al and Fe to allow the precipitation of fine copper particles on the surface. The acid and base used in this leaching process include inorganic acids, inorganic bases and organic bases, and are not particularly limited. The concentration of the acid and base may be any concentration at which reaction with aluminum occurs; a concentration at which the product generated by the leaching treatment is dissolved in the treatment solution is preferable. The temperature for leaching is selected from a range of 0 to 90° C., whereupon the catalyst shows high activity.

The fine particles obtained are filtered, washed sufficiently, and dried, after which it is molded, if necessary, to be used as a catalyst. The fine particles can also be used by introducing them on carriers. The catalyst produced by the process of the present invention may be used in any reactor system, such as a fixed-bed circulation-type reactor or a fluidized-bed reactor, and the catalyst may be used not only in gas-phase reactions but also in liquid-phase reactions.

EXAMPLES

Hereinafter, the present invention is described in more detail by reference to the Examples. However, the present invention is not limited to the following examples.

Example 1

4.29 g Al, 4.01 g Cu and 1.69 g Fe were weighed, and arc-melted in a water-cooled copper hearth under argon. The 10 g ingot of $Al_{63}Cu_{25}Fe_{12}$ obtained, was ground and sealed under vacuum in a quartz tube and annealed at 800° C. for 24 hours. The sample was then milled with a planetary ball mill and treated with 20 wt % aqueous sodium hydroxide for 24 hours. After filtration, the sample was washed sufficiently with water, and then dried. After addition of 2 wt % graphite powder, the sample was compressed, and ground into a powder of 16- to 30-mesh size. This product was designated as catalyst 1.

Example 2

A catalyst was prepared in the same manner as in Example 1 except that 3.78 g Al, 3.53 g Cu and 2.69 g Ru were used to produce a 10 g ingot of $Al_{63}Cu_{25}Ru_{12}$. The product was designated as catalyst 2.

Example 3

A catalyst was prepared in the same manner as in Example 1 except that 3.05 g Al, 2.85 g Cu and 4.10 g Os were used to produce a 10 g ingot of $Al_{63}Cu_{25}Os_{12}$. The product was designated as catalyst 3.

Comparative Example 1

By the method described in Example 1 of JP-A 59-189937 (precipitation method), a Cu—Zn—Al catalyst was produced. This product was used as a comparative catalyst.

Test Example 1
(Catalyst Activity Test)

1 g of catalyst produced in each of the Examples and the Comparative Example was weighed and evaluated by passing a mixed solution of water/methanol (molar ratio 1.5) at a reaction temperature of 280° C. under normal pressures in a fixed-bed circulation-type reactor. The activity of each catalyst was evaluated by analyzing the generated gas in gas chromatography and expressed in terms of the rate of generation of hydrogen. The results are shown in Table 1.

TABLE 1

|  | Compsn. of quasi-crystal (atom-%) | Rate of generation of hydrogen (1/kg/min.) |
|---|---|---|
| Example 1 | $Al_{63}Cu_{25}Fe_{12}$ (catalyst 1) | 260 |
| Example 2 | $Al_{63}Cu_{25}Fe_{12}$ (catalyst 2) | 208 |
| Example 3 | $Al_{63}Cu_{25}Os_{12}$ (catalyst 3) | 182 |
| Com. Ex. | (Cu—Zn—Al catalyst by precipitation) | 240 |

Industrial Applicability

As can be seen from the results of the above-described examples, the catalyst for steam reforming of methanol produced by the process of the present invention has almost the same level of activity as the catalyst produced by a conventional precipitation process.

The Al alloy ingot containing quasi-crystals serving as the starting material in the present invention can be produced relatively easily by arc-melting etc., and the desired catalyst can be easily obtained from the powder prepared by grinding and leaching the Al alloy ingot. Accordingly, in the method of the present invention, tedious procedures such as control of pH using precipitants, and calcination are not necessary, thereby, making the production of the catalyst for steam reforming of methanol a simple process.

What is claimed is:

1. A process for producing a catalyst for steam reforming methanol, which comprises
   grinding an Al alloy which contains a quasi-crystal consisting of aluminum, copper, and at least one metal atom selected from the group consisting of Fe, Ru and Os, thereby obtaining an alloy particle, and
   leaching the alloy particle.

2. A process for producing a catalyst for the steam reforming of methanol, which comprises
   annealing an Al alloy which contains a quasi-crystal consisting of aluminum, copper, and at least one metal atom selected from the group consisting of Fe, Ru and Os, grinding the annealed Al alloy, thereby obtaining an alloy particle, and
   leaching the alloy particle.

3. A process for producing a catalyst for the steam reforming of methanol, which comprises
   annealing an Al alloy that contains a quasi-crystal of a composition expressed by the following formula:

$Al_{100-a-b}Cu_aM_b$, wherein M is at least one metal selected from the group consisting of Fe, Ru and Os, 17 atom-% ≦ a ≦ 30 atom-%, and 7 atom-% ≦ b ≦ 17 atom-%,
   grinding the Al alloy, thereby obtaining an alloy particle, and
   leaching the alloy particle.

* * * * *